United States Patent [19]

Sherman

[11] Patent Number: 4,780,925
[45] Date of Patent: Nov. 1, 1988

[54] DIPSTICK GUIDE WITH AUTOMATIC WIPER

[76] Inventor: Jay F. Sherman, 7681 Walnut Ave., Jenison, Mich. 49428

[21] Appl. No.: 15,311

[22] Filed: Feb. 17, 1987

[51] Int. Cl.$^4$ .................... A47L 25/00; F01M 11/12; B60S 1/62
[52] U.S. Cl. .................... 15/210 B; 15/256.5
[58] Field of Search .............. 15/210 B, 210 R, 221, 15/104.92, 256.5; 33/126.7 A, 126.7 R; 73/290 B

[56] References Cited

U.S. PATENT DOCUMENTS

| | | | |
|---|---|---|---|
| 1,553,915 | 9/1925 | Rix et al. | 15/210 B |
| 1,814,075 | 7/1931 | Burkhardt | 15/210 B |
| 1,992,423 | 2/1935 | Hale | 15/210 B |
| 2,029,672 | 2/1936 | Rankin | 15/210 B |
| 2,201,517 | 5/1940 | Bow | 15/210 B |
| 2,855,682 | 10/1958 | Norgard | 15/210 B |
| 4,017,935 | 4/1977 | Hernandez | 15/210 B |
| 4,419,781 | 12/1983 | Meegan | 15/210 B |
| 4,553,637 | 11/1985 | Tanner | 15/210 B |

FOREIGN PATENT DOCUMENTS

| | | | |
|---|---|---|---|
| 520210 | 1/1956 | Canada | 15/210 B |
| 1161317 | 8/1969 | United Kingdom | 15/210 B |

*Primary Examiner*—Philip R. Coe
*Assistant Examiner*—Joseph S. Machuga

[57] ABSTRACT

An attachment to the top of the ullage rod tube of an engine is equipped with a block of resilient material, such as foam, against which the rod can be pushed as it is withdrawn from the crank case to automatically and simultaneously wipe the face of the rod so it can be read without the use of other wiping means. The position of the block is such that is does not interfere with reinsertion of the rod into the tube.

2 Claims, 2 Drawing Sheets

DIPSTICK GUIDE WITH AUTOMATIC WIPER

FIELD OF THE INVENTION

This invention relates to accessories for engines which have a crank case containing oil and are equipped with a ullage rod or dipstick for determining whether the quantity of oil present in the engine is sufficient for safe operation. This invention is related to preparing the ullage rod for reading by providing convenient means for wiping the rod the first time it is withdrawn from the oil pool or crank case.

BACKGROUND OF THE INVENTION

Combustion engines, other than of the two cycle variety, normally have a crank case in which there is a pool of oil to provide engine lubrication. It is necessary in these types of engines that the quantity of oil in the pool be maintained within a specified range. Since the chamber in which this oil is confined must be closed or almost closed, the conventional way of determining whether or not adequate oil is present is by the use of a ullage rod, the bottom end of which, when the rod is fully inserted through a tube into the crank case or other oil containing chamber, has indicia on it which will inform the user whether sufficient oil is present for safe operation of the engine. It is conventional practice to store the ullage rod, fully inserted, into the chamber between uses. Thus, when it is first withdrawn from the chamber, the face of the rod bearing the measurement indicia must be wiped of the film that exists on the rod. The film of oil on the rod as initially withdrawn is meaningless because it also represents oil splashed far above the measurement indicia by the operation of the engine. Unless this film is removed, it is not possible to get an accurate reading of the oil level. Thus, it is conventional practice to withdraw the rod, wipe the lower end of it clean with anything that happens to be handy, such as paper toweling or a cloth, or as often is done in many service stations, between the thumb and forefinger. If the conventional paper or toweling is used, it is necessary to find an appropriate facility to dispose of it because it will transfer an oily film to anything it contacts. Various devices have been developed to provide means for wiping the rod without the use of paper toweling or the like. These include the oil dipstick wipers disclosed in U.S. Pat. Nos. 4,023,231, issued May 17, 1977 to Haber, 4,017,935, issued Apr. 19, 1977 to Hernandez and 2,855,682, issued Oct. 14, 1958 to Norgard. Each of these devices provides a means of wiping the ullage rod or dipstick as it is removed from the tube through which it is inserted into the oil pool or crank case. In addition to this, means which are otherwise stored in the engine compartment to be readily available for wiping the rod are disclosed in patents such as U.S. Pat. Nos. 1,553,915, issued Sept. 15, 1925 to Rix et al., 1,947,833, issued Feb. 20, 1934 to Dolbier and 4,245,367, issued Jan. 20, 1981 to Stoute. Applicant's invention provides an improvement over all of these various attempts to provide a simplified and inexpensive solution to the problem.

BRIEF DESCRIPTION OF THE INVENTION

The invention provides a fan-shaped ullage rod guide and foam wiping element which can be readily mounted to the exposed end of the ullage rod tube. The flared or fan-shaped attachment can be fabricated of any suitable material which is stable in the presence of oil and gasoline at the temperatures normally experienced in an engine compartment. Preferably, the device is brightly colored to increase its visibility under either bad lighting conditions or a difficult location in the engine compartment. At least one of these conditions is often experienced under the circumstances when it is desirable or necessary to check the oil level. The invention is an attachment that can be readily mounted on existing ullage rod equipment and, therefore, is particularly suitable for after market use and installation. It also is so designed that the actual wiping element can be readily replaced after sufficient use to impair its utility. The invention provides a device which is so simple that the cost of its manufacture is low enough to make the device attractive to the average automobile owner. Its installation is so simple that it can be done with a single tool, that being, a screwdriver or pliers. The invention encourages the more frequent checking of oil level, even under circumstances which would normally be inconvenient because of the absence of the availability of any material to properly wipe the ullage rod before it is inserted back into the oil pan or crank case for making the actual measurement of the quantity of oil present. By thus making the checking of the oil level a quick, easy operation which will not necessitate the operator becoming dirty in performing the check will encourage the more frequent check of oil levels and thus, avoid the possibility of the very costly repairs which can occur when the oil level for any one of a number of reasons happens to fall below a certain minimum. It is well-known that, for reasons that are not always readily explainable or understood, even engines having good oil retention characteristics will on occasion quickly lose an unusual amount of oil, sometimes to the point of being dangerous to the engine's integrity. Therefore, frequent checking of the oil level is an advisable precaution against the surprise of substantial and costly engine repairs.

DESCRIPTION OF THE PREFERRED EMBODIMENTS

Figure 1:
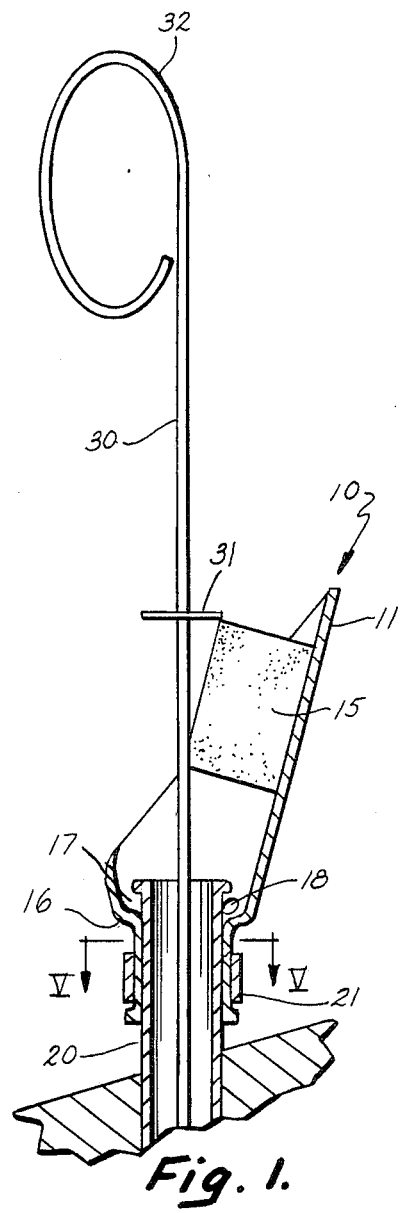
FIG. 1 is a fragmentary sectional view of a ullage rod tube with this invention attached and the rod partially withdrawn.
Figure 2:
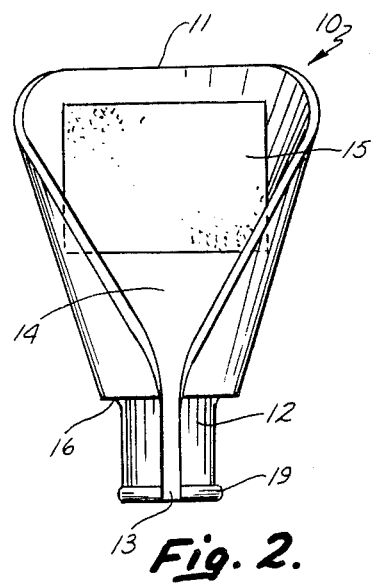
FIG. 2 is an elevation view of the invention before installation on the ullage rod tube.
Figure 3:
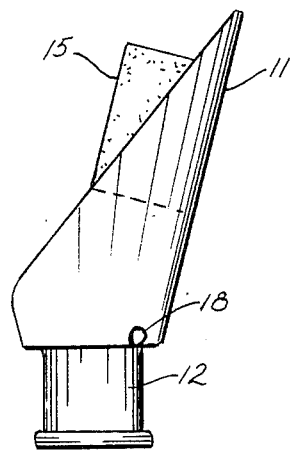
FIG. 3 is a side elevation view of the invention illustrated in FIG. 2.
Figure 4:
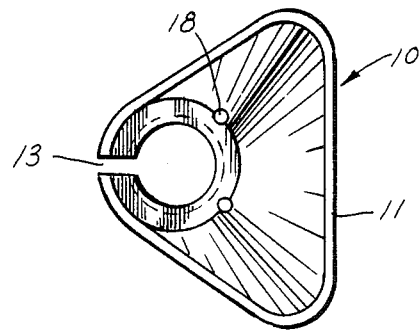
FIG. 4 is a plan view of the invention illustrated in FIG. 2 with the rod wiper omitted for clarity.

FIGS. 1–6 illustrate the invention, incorporating a design which may be used by the original equipment manufacturers but more specifically designed for purchase and installation by the user, that is, the aftermarket. As illustrated in FIGS. 1-4, the invention has a body member 10 of generally fan-shaped construction which, in a downward direction, tapers from an open, flared top portion 11 to a substantially circular collar 12. The collar 12 is split with an opening 13 which, as it progresses upwardly into the flared portion, opens out into a broad, generally v-shaped, front opening 14. In utilizing the term "front" it is to be understood that this term is applied to the face of the body which is generally open, irrespective of whether the design of the engine to which it is applied requires this to be turned toward or away from the user. The flared portion or back panel 11 is inclined at a small angle away from the vertical and from the central axis of the collar portion 12. Mounted in the upper portion of the flared, cup portion of the body is a wiper element 15, preferably of a generally rectangular configuration. The wiper element is preferably of a foam type material, but may be of a resilient material which is not of the porous or foam construction. It must be of a material which is resistant to deterioration in the presence of oil and of the heat which is environmental to use on combustion engines. Thus, it must be a heat resistant plastic meeting the SAE specifications for "under the hood application" for automobiles or similar combustion engine environments. It must be of resilient material for the reasons that will be readily understood upon study of the hereinafter explained functional characteristics of this invention.

The body or hood 10, as illustrated in FIGS. 1-6 is preferably molded of a plastic which, like the wiper element 15, is unaffected by the presence of lubricating oils, combustion fumes and the temperatures normally encountered in close contact with the crank case of an automobile or similar combustion engine. Preferably, a bright distinguishing color is added to the plastic, such as a bright fluorescent yellow, such as a "day glow" color. Other colors, such as orange and lime green can be used, all of which serve the purpose of making the location of the dipstick and the tube into which it must be inserted more readily visible under poor conditions of visibility. This is a material advantage because more often than not the location is such that it is shielded from adequate lighting sources available in service stations or in the average vehicle owners garage where it seems that more often than not the tube for the dipstick is located on the side of the engine away from the light source.

Figure 5:
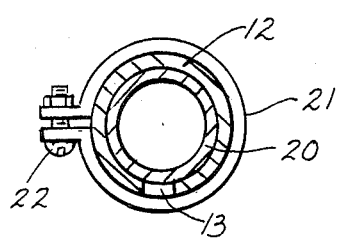
FIG. 5 is a sectional view taken along the plane V—V of FIG. 1.

To install the device on the typical ullage rod or dipstick tube, the split collar 12 is opened enough to allow it to pass over the end of the tube 20 (FIG. 1) and then a clamp 21 is placed around the collar and tightened by any conventional means such as the screw and nut 22 illustrated in FIG. 5.

Where the flared upper portion of the body 10 joins the collar 12, the body is provided with a radially outwardly extending step or offset 16, forming a sort of inside shelf or ledge at the top entrance to the collar portion 12.

The offset 16 provides a trap 17 for debris which may fall into the open cup-like portion of the body 10, including water and other materials which it is undesirable to permit to enter the oil chamber or crank case. In order to drain any water or similar liquids which may enter the trap 17, a pair of drain openings 18, preferably of about ⅛ diameter are provided right at the bend where the radially extending ledge portion of the base of the trap 17 enters the upwardly extending flared back of the body. This is a safeguard eliminating the possibility of the trap 17 becoming clogged and water or similar liquids spilling over into the tube 20.

The ullage rod 30 is illustrated in partially withdrawn position in FIG. 1. It will be noted that it has a stop 31 at a point well removed from the handle 32. The stop 31 is important to the ullage rod because it provides a positive stop by which the operator may know that the ullage rod has been inserted to the full depth necessary to make an accurate reading of the depth of the oil in the oil compartment or crank case of the engine. The rod may have an offset portion instead of the stop 31 serving the same purpose. The normal ullage rod or dipstick 30 is a long, flexible member of sufficient resilience that it may be flexed as it is withdrawn from the tube. Thus, as is clearly evident from FIG. 1, as the rod is withdrawn it can be flexed forwardly sufficiently that the stop 31 can be caused to pass in front of the wiper element 15 and then the withdrawal of the rod continued either while making contact with the lower front corner of the wiper element or while flexed forwardly just enough so that no contact is made until the lower end of the rod approaches the wiper element. At this point, the deflection of the rod is reduced allowing the lower front corner of the wiper element 15 to make contact with the adjacent face of the ullage rod to wipe it clean of any film on its surface. In the preferred construction illustrated, the point of contact between the rod 30 and the wiper 15 is over the open end of the tube 20, permitting any substantial quantity of oil removed from the rod to drip back into the tube. As the rod is reinserted, at least during the entry of the initial portion of the rod, the operator is careful to maintain clearance between the face of the rod and the wiper element 15. However, should he fail to do this all that will happen is to apply a second wiping to the face of the rod. When the rod is removed the second time for the specific purpose of obtaining a reading as to the quantity of oil in the crank case or oil chamber, the operator is then careful to keep the rod at flexed slightly forwardly to avoid contact with the wiper element. Thus, the film which is necessary to provide a proper reading of the quantity of oil in the crank case or oil compartment will remain because the film resulting from the rod 15 penetration of the oil when the rod is fully seated with the stop 31 against the top of the tube 20 will not have been erased by the wiper element. It will be seen in this operation that the operator's hands need not make contact with any of the oil covered portions of the ullage rod nor is it necessary for the operator to have paper, a cloth or any other similar element handy in order to wipe the rod when it is first removed. As previously explained, oil wiped from the rod by the wiper element which is in excess of that which can be retained by the wiper element will drip back down the tube 20 into the crank case, thereby, preventing it from becoming smeared on the exterior surface of the engine. However, oil which remains and accumulates on the wiper element 15 may work its way back to the top portion 11 and drain down into the trap 17. Since this oil will have been exposed to the dust and grit normally present in the engine compartment it is important that it not reenter the crank case. The presence of the trap prevents this and the holes 18 are insurance against its accumulation in the trap despite the presence of the opening 13. Particularly are the drain holes 18 important, if the invention is so mounted that the trap 17 is flush or substantially flush with the top of the tube 20.

When the invention has been used long enough that there is either wear or such oil saturation of the wiper element 15 that it is no longer an effective device for removing the film of oil from the face of the ullage rod, the wiper element can be replaced. While there are several ways in which this can be done, a preferable construction is that in which the wiper element 15 is initially provided with a contact adhesive on one face, protected by a removable film. Thus, when the wiper element no longer is functionally effective, it can simply be peeled off the body 10, leaving a clean bonding area where it was adhered to the body so that a new wiper element 15 can be substituted for it by bonding it to the clean area. While this is the simplest and preferred arrangement for replacing the wiper element, it will be recognized that other arrangements could be used for temporarily securing the wiper element to the body 10.

Figure 6:
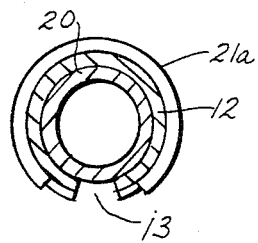
FIG. 6 is a sectional view similar to FIG. 5, illustrating a modified construction for the invention.
Figure 7:
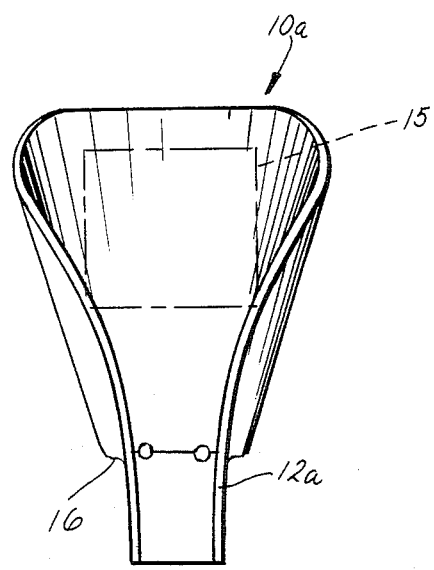
FIG. 7 is an elevation view similar to FIG. 2, illustrating a modified construction for the invention.
Figure 8:
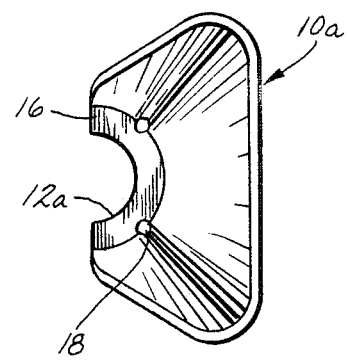
FIG. 8 is a plan view of the invention as illustrated in FIG. 7 with the rod wiper omitted for clarity.

FIGS. 7 and 8 illustrate a modification of this invention, particularly designed for OEM, that is, original equipment manufacturers installation. In this case, the body 10a is formed of metal and instead of having at its lower end a full, split collar, it has only a half collar 12a. Being of metal, it is not necessary that it have the reinforcement bottom ridge 19, although this could be provided. This construction is provided where it is intended that the body 10a will be sweat soldered onto the upper end of the tube 20. This is a construction which can be used by the original equipment manufacturer since, at this point, the engine has not been operated and the upper end of the tube 20 is clean and, therefore, will permit the adherence of the anchoring medium, such as solder. In the case of after market installation, the presence of oils and greases on the surface of the tube make this type of attachment difficult, if not impossible. The unit illustrated in FIGS. 7 and 8 has the same functional characteristics as the unit illustrated in FIGS. 1–6, except for the manner in which it is secured to the tube.

FIG. 6 illustrates a slight modification of the construction illustrated in FIG. 5 in that, instead of the clamp 21, the body is secured by a snap ring 21a, eliminating the necessity for the bolt and nut arrangement characteristic of the clamp 21.

Preferably the body 10a, when constructed of metal, has a suitable baked-on, oil, combustion fume and heat resistant coating of a bright color, such as orange, yellow or the like to increase its visibility for the same purposes as have been described in connection with the plastic body member.

Figure 9:
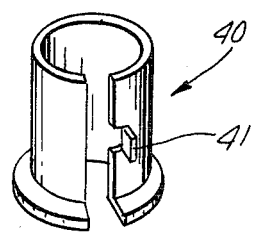
FIG. 9 is an oblique view of a collar to adapt the invention to dipstick tubes of smaller diameter.
Figure 10:
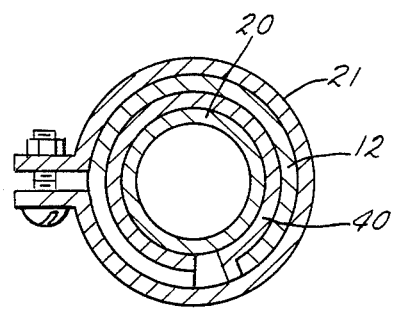
FIG. 10 is a cross section taken along the same plane as FIG. 5 but with the collar of FIG. 9 in place.

The several makes of automobile engines use ullage rod tubes of different sizes. It is contemplated that the hood or body member 10 will be made in a single size for the sake of economy of manufacture. To adapt this larger size body member to the smaller tubes, a split adapter 40 is provided (FIG. 9). The adapter 40 seats inside the collar 12 of the body member and preferably has an outwardly turned finger 41 which serves as a key when seated in the opening 13 of the body member, preventing rotation of the body member relative to the adapter (FIG. 10).

While this invention has been described as applied to the crank case of an engine, it could be applied to other equipment using ullage rods such as automatic transmissions and non-pressurized storage tanks for hydraulic fluid.

Having described the preferred embodiment of this invention, together with modifications thereof, it will be recognized that other modifications may be made without departing from the principle of the invention. Such modifications are to be considered as included in the hereinafter appended claims, unless these claims by their language expressly state otherwise.

I claim:

1. Means for wiping liquid from the indicia bearing face of a ullage rod which enters the liquid containing chamber through a tube only when the rod is withdrawn while aligned with the axis of the tube, said means comprising: a body element having an upper portion and a generally circular base, said base being generally cylindrical and having a internal passage of a size to receive said tube therethrough, said upper portion of said body flaring upwardly and outwardly to form a hood open at the top, said hood having back and side portions, said back portion being rearwardly inclined, said side portions being curved to extend downwardly and forwardly to define a front opening which converges downwardly in a generally V-shape to a generally horizontal ledge portion that extends generally radially outwardly from the upper end of said base, said hood, ledge portion and base all being integral, the central portion of the upper part of the back portion being flat; a compressible wiper element secured to the inner face of said central portion, said element extending from said central portion at least to a position at which a portion of it intersects a plane assumed by the indicia bearing face of the ullage rod as it is withdrawn from said tube while straight and aligned with the central axis of the tube; said base being vertically split at the front whereby its internal opening can be varied to fit tubes of different sizes, means for clamping said base around the tube.

2. The means for wiping liquid from the indicia bearing face of a ullage rod described in claim 1 wherein said ledge has a drain opening adjacent the junction of said ledge and the upper portion.

* * * * *